(12) United States Patent
Maeda

(10) Patent No.: US 11,884,805 B2
(45) Date of Patent: Jan. 30, 2024

(54) SEALANT AND SEALANT COMPOSITION FOR ELECTROCHEMICAL DEVICE

(71) Applicant: ZEON CORPORATION, Tokyo (JP)

(72) Inventor: Kouichirou Maeda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 203 days.

(21) Appl. No.: 17/593,393

(22) PCT Filed: Mar. 5, 2020

(86) PCT No.: PCT/JP2020/009434
§ 371 (c)(1),
(2) Date: Sep. 17, 2021

(87) PCT Pub. No.: WO2020/189306
PCT Pub. Date: Sep. 24, 2020

(65) Prior Publication Data
US 2022/0186013 A1    Jun. 16, 2022

(30) Foreign Application Priority Data

Mar. 20, 2019 (JP) .................................. 2019-053513

(51) Int. Cl.
*C08L 23/22* (2006.01)
*H01M 50/193* (2021.01)
*C09K 3/10* (2006.01)
*H01M 50/184* (2021.01)

(52) U.S. Cl.
CPC ................ *C08L 23/22* (2013.01); *C09K 3/10* (2013.01); *H01M 50/193* (2021.01); *C08L 2203/20* (2013.01); *C09K 2200/0607* (2013.01); *C09K 2200/0617* (2013.01); *H01M 50/184* (2021.01)

(58) Field of Classification Search
CPC .. C08L 23/22; C08L 2203/20; H01M 50/193; H01M 50/184; C09K 3/10; C09K 2200/0607; C09K 2200/0617

USPC ........................................................ 524/574
See application file for complete search history.

(56) References Cited

U.S. PATENT DOCUMENTS

2008/0293852 A1   11/2008   Gronowski et al.
2015/0240131 A1    8/2015   Furuya et al.

FOREIGN PATENT DOCUMENTS

| CN | 101072826 A | | 11/2007 |
|---|---|---|---|
| JP | 2014056675 A | * | 3/2014 |
| JP | 2014056675 A | | 3/2014 |
| JP | 2016035039 A | * | 3/2016 |
| JP | 2016035039 A | | 3/2016 |
| JP | 5974748 B2 | | 8/2016 |
| WO | 2006060896 A1 | | 6/2006 |

OTHER PUBLICATIONS

Sep. 29, 2022, the Extended European Search Report issued by the European Patent Office in the corresponding European Patent Application No. 20773426.0.
May 26, 2020, International Search Report issued in the International Patent Application No. PCT/JP2020/009434.
Sep. 16, 2021, International Preliminary Report on Patentability issued in the International Patent Application No. PCT/JP2020/009434.

* cited by examiner

*Primary Examiner* — Ling Siu Choi
*Assistant Examiner* — Ronald Grinsted
(74) *Attorney, Agent, or Firm* — KENJA IP LAW PC

(57) ABSTRACT

A sealant for an electrochemical device contains (A) a polyisobutylene polymer and (B) a conjugated diene polymer. The sealant contains the (A) polyisobutylene polymer in a proportion of more than 60 mass % and not more than 98 mass % and the (B) conjugated diene polymer in a proportion of not less than 2 mass % and less than 40 mass % relative to the total mass of the (A) polyisobutylene polymer and the (B) conjugated diene polymer.

3 Claims, No Drawings

SEALANT AND SEALANT COMPOSITION FOR ELECTROCHEMICAL DEVICE

TECHNICAL FIELD

The present disclosure relates to a sealant for an electrochemical device that can be used in an electrochemical device in which an electrolyte solution is used, such as in a lithium ion battery, and also relates to a sealant composition for an electrochemical device in which this sealant is used.

BACKGROUND

Examples of electrochemical devices in which electrolyte solutions are used include electric double-layer capacitors, lithium ion batteries, and so forth. In such electrochemical devices, it is necessary to prevent evaporation and leakage of electrolyte solution sealed therein and also to prevent infiltration of undesirable substances from outside of the electrochemical device. For this reason, sealants are widely used in electrochemical devices.

A sealant for a secondary battery that contains a polymer including an isobutylene block and a styrene block and a diene rubber in a specific mass ratio has previously been proposed as a sealant for a secondary battery (for example, refer to Patent Literature (PTL) 1). In a sealant for a secondary battery disclosed by PTL 1, the mass ratio of the diene rubber and the polymer described above is 40/60 to 80/20 in terms of diene rubber/polymer. This sealant for a secondary battery makes it possible to form a sealant layer having excellent water resistance, humidity resistance, and heat resistance.

CITATION LIST

Patent Literature

PTL 1: JP2014-56675A

SUMMARY

Technical Problem

In a situation in which a sealant is adopted in an electrochemical device and is caused to display sealing ability, this may be achieved by forming a sealant layer that is a layer formed of the sealant. Formation of a sealant layer is typically carried out by applying a sealant composition containing a sealant onto a target for application of the sealant (hereinafter, also referred to simply as an "application target") to form a coating film, and then drying the coating film to form a sealant layer. The electrochemical device can be sealed by adhering adhesion targets that are constituent elements of the electrochemical device via the sealant layer. When the sealant layer has a larger elongation at break, this enables better sealing of the electrochemical device.

Conventionally, the upper limit for temperature during operation or storage of an electrochemical device such as a lithium ion battery is recommended to be approximately 70° C., for example, from a viewpoint of heat resistance of various elements included in the electrochemical device. However, the performance of an electrochemical device such as a lithium ion battery, in general, tends to improve during operation under higher temperature conditions. Moreover, there has been increasing demand in recent years for causing electrochemical devices to display even higher performance than conventionally achieved, and there is demand for enabling operation of electrochemical devices under higher temperature conditions.

However, there is room for further improvement of the sealant for a secondary battery proposed in PTL 1 in terms of heat resistance and elongation at break of a sealant layer obtained using the sealant.

Accordingly, one object of the present disclosure, in view of the situation described above, is to provide a sealant with which it is possible to produce a sealant composition that can form a sealant layer having excellent heat resistance and large elongation at break.

Another object of the present disclosure is to provide a sealant composition that can form a sealant layer having excellent heat resistance and large elongation at break.

Solution to Problem

The inventor conducted diligent investigation with the aim of solving the problems set forth above. The inventor reached a new finding that by compounding a specific amount of a conjugated diene polymer in a sealant having a polyisobutylene polymer as a main component, it is possible to form a sealant layer having excellent heat resistance and large elongation at break. In this manner, the inventor completed the present disclosure.

Specifically, the present disclosure aims to advantageously solve the problems set forth above, and a presently disclosed sealant for an electrochemical device comprises: (A) a polyisobutylene polymer; and (B) a conjugated diene polymer, wherein the (A) polyisobutylene polymer is contained in a proportion of more than 60 mass % and not more than 98 mass % and the (B) conjugated diene polymer is contained in a proportion of not less than 2 mass % and less than 40 mass % relative to total mass of the (A) polyisobutylene polymer and the (B) conjugated diene polymer. When a sealant for an electrochemical device contains (A) a polyisobutylene polymer in a proportion of more than 60 mass % and not more than 98 mass % and (B) a conjugated diene polymer in a proportion of not less than 2 mass % and less than 40 mass %, it is possible to produce a sealant composition that can form a sealant layer having excellent heat resistance and large elongation at break.

It is preferable that the presently disclosed sealant for an electrochemical device further comprises (C) a colorant, wherein the (C) colorant is contained in a proportion of not less than 1 mass % and not more than 10 mass % relative to total mass of the (A) polyisobutylene polymer and the (B) conjugated diene polymer. When the content of the (C) colorant in the sealant for an electrochemical device is within the range set forth above, it is possible to increase visibility when the sealant for an electrochemical device is applied onto an adherend and also to further increase elongation at break of an obtained sealant layer.

Moreover, the present disclosure aims to advantageously solve the problems set forth above, and a presently disclosed sealant composition for an electrochemical device comprises: an organic solvent; and any one of the sealants for an electrochemical device set forth above. By compounding the presently disclosed sealant for an electrochemical device in production of a sealant composition for an electrochemical device, it is possible to provide a sealant composition that can efficiently form a sealant layer having excellent heat resistance and large elongation at break.

Advantageous Effect

According to the present disclosure, it is possible to provide a sealant with which it is possible to produce a sealant composition that can form a sealant layer having excellent heat resistance and large elongation at break.

Moreover, according to the present disclosure, it is possible to provide a sealant composition that can efficiently form a sealant layer having excellent heat resistance and large elongation at break.

DETAILED DESCRIPTION

The following provides a detailed description of embodiments of the present disclosure.

The presently disclosed sealant for an electrochemical device can suitably be used in an application of sealing an electrochemical device. In particular, the presently disclosed sealant for an electrochemical device can suitably be used in sealing of an electrochemical device that contains an electrolyte solution containing an organic solvent (hereinafter, referred to as a "non-aqueous electrolyte solution"). Moreover, the presently disclosed sealant for an electrochemical device enables suitable production of the presently disclosed sealant composition for an electrochemical device.

(Sealant for Electrochemical Device)

The presently disclosed sealant for an electrochemical device (hereinafter, also referred to simply as the "presently disclosed sealant" or "sealant") contains (A) a polyisobutylene polymer and (B) a conjugated diene polymer. A feature of the presently disclosed sealant is that the presently disclosed sealant contains the (A) polyisobutylene polymer in a proportion of more than 60 mass % and not more than 98 mass % and the (B) conjugated diene polymer in a proportion of not less than 2 mass % and less than 40 mass % relative to the total mass of the (A) polyisobutylene polymer and the (B) conjugated diene polymer. As a result of having the (A) polyisobutylene polymer as a main component and also containing the (B) conjugated diene polymer in a proportion of not less than 2 mass % and less than 40 mass %, the presently disclosed sealant enables production of a sealant composition that can form a sealant layer having excellent heat resistance and large elongation at break. The presently disclosed sealant preferably further contains (C) a colorant and may optionally contain various other compounding agents.

<(A) Polyisobutylene Polymer>

The presently disclosed sealant contains (A) a polyisobutylene polymer. The (A) polyisobutylene polymer may be a homopolymer of isobutylene, a copolymer of isobutylene and isoprene (for example, butyl rubber), or a block copolymer including an isobutylene block and a styrene block. One of these polymers may be used individually, or a plurality of these polymers may be used in combination. Of these polymers, a copolymer of isobutylene and isoprene (for example, butyl rubber) or a block copolymer including an isobutylene block and a styrene block is preferable as the (A) polyisobutylene polymer from a viewpoint of forming a sealant layer having even larger elongation at break.

The copolymer of isobutylene and isoprene that may be used as the (A) polyisobutylene polymer can be a copolymer of isobutylene and isoprene that includes monomer units derived from isoprene in a proportion of preferably 0.5 mol % or more, and more preferably 0.8 mol % or more, and in a proportion of preferably 15.0 mol % or less, and more preferably 5.0 mol % or less. When the proportion in which isoprene-derived monomer units are included in the copolymer of isobutylene and isoprene is not more than any of the upper limits set forth above, it is possible to form a sealant layer having excellent gas barrier properties. Note that the proportional content of a given monomer unit in a polymer can be measured by $^1$H-NMR.

The block copolymer including an isobutylene block and a styrene block that may be used as the (A) polyisobutylene polymer can be a block copolymer obtained through copolymerization of a monomer composition containing isobutylene monomer and styrene monomer, but is not specifically limited thereto.

The block copolymer may have any configuration without any specific limitations and may be an [(A)-(B)] type diblock copolymer, an [(A)-(B)-(A)] type triblock copolymer, a block copolymer having an equal or larger number of blocks, or the like. Of these examples, a styrene-isobutylene-styrene (SIBS) triblock copolymer is preferable as a block copolymer used as the (A) polyisobutylene polymer. This is because a sealant layer having excellent gas barrier properties can be formed. SIBSTAR® (SIBSTAR is a registered trademark in Japan, other countries, or both; produced by Kaneka Corporation) is preferably used as this SIBS triblock copolymer.

The proportional content of styrene units in the block copolymer is preferably 70 mol % or less, and more preferably 50 mol % or less from a viewpoint of enabling formation of a sealant layer having even larger elongation at break.

<(B) Conjugated Diene Polymer>

The presently disclosed sealant contains (B) a conjugated diene polymer in addition to the (A) polyisobutylene polymer described above. The (B) conjugated diene polymer is a polymer that is obtained through polymerization of a conjugated diene compound. Specific examples of the conjugated diene compound include, but are not specifically limited to, 1,3-butadiene, isoprene, 2,3-dimethyl-1,3-butadiene, 1,3-pentadiene, 2-methyl-1,3-pentadiene, 1,3-hexadiene, and 4,5-dimethyl-1,3-octadiene. One of these conjugated diene compounds may be used individually, or two or more of these conjugated diene compounds may be used in combination. Of these conjugated diene compounds, 1,3-butadiene and isoprene are particularly preferable.

It should be noted that the (B) conjugated diene polymer may be a polymer that is obtained through polymerization of only a conjugated diene compound or may be a copolymer of a conjugated diene compound and a compound other than the conjugated diene compound that is copolymerizable with the conjugated diene compound (however, a compound corresponding to the (A) polyisobutylene polymer described above is excluded). Of such polymers, a polymer that is obtained through polymerization of only a conjugated diene compound is preferable as the (B) conjugated diene polymer.

The molecular weight of the (B) conjugated diene polymer, in terms of weight-average molecular weight (Mw), is preferably not less than 100,000 and not more than 1,000,000. Note that the "weight-average molecular weight (Mw)" can be determined as a polystyrene-equivalent value by GPC (Gel Permeation Chromatography).

No specific limitations are placed on the method by which the (B) conjugated diene polymer is produced. The method of polymerization may, for example, be emulsion polymerization or solution polymerization. Moreover, the polymerization reaction may, for example, be radical polymerization, anionic polymerization, or the like. Of these methods, solution polymerization using radical polymerization is preferable.

The polymerization can be performed in the presence of a polymerization initiator in a temperature range of normally 0° C. or higher, preferably 10° C. or higher, and more preferably 20° C. or higher, and of normally 150° C. or lower, preferably 100° C. or lower, and more preferably 80° C. or lower.

<Proportional Content of (A) Polyisobutylene Polymer and (B) Conjugated Diene Polymer>

The presently disclosed sealant contains the (A) polyisobutylene polymer in a proportion of more than 60 mass % and not more than 98 mass % and the (B) conjugated diene polymer in a proportion of not less than 2 mass % and less than 40 mass % relative to the total mass of the (A) polyisobutylene polymer and the (B) conjugated diene polymer. When the proportional content of the (B) conjugated diene polymer is 2 mass % or more, heat resistance and elongation at break of an obtained sealant layer can be increased. Moreover, when the proportional content of the (B) conjugated diene polymer is less than 40 mass %, elongation at break of an obtained sealant layer can be increased. The proportion constituted by the (B) conjugated diene polymer is preferably not less than 4 mass % and not more than 16 mass % from a viewpoint of further increasing effects such as described above.

<(C) Colorant>

The presently disclosed sealant preferably contains (C) a colorant. The inclusion of the (C) colorant in the sealant makes it possible for the state of coating when the sealant composition is applied onto an adherend to be judged by inspection of external appearance. In other words, it is possible to analyze the external appearance of the coating surface and inspect whether the coating state is uniform and whether there is unevenness of coating. The colorant preferably does not react with an electrolyte solution or dissolve in the electrolyte solution, and may be any of various organic or inorganic pigments. Of such pigments, carbon-based pigments such as carbon black and graphite can suitably be used. This is because the coating state is easy to judge based on the external appearance of an obtained coating surface, and particularly based on the brightness thereof, in a case in which a carbon-based pigment is compounded in the sealant. Specific examples of carbon black include furnace black, channel black, and so forth. Specific examples of graphite include artificial graphite, natural flake graphite, and so forth. One of these pigments may be used individually, or two or more of these pigments may be used in combination. Of carbon-based pigments, carbon black is preferably used. The primary particle diameter of the carbon black is preferably 100 nm or less. Note that the primary particle diameter of the carbon black is the volume-average particle diameter D50 of primary particles of the carbon black (i.e., particles forming aggregates in a case in which the carbon black is in the form of aggregates). The volume-average particle diameter D50 is the particle diameter corresponding to a cumulative value of 50% from the small diameter end in a cumulative particle diameter distribution, by volume, according to laser diffraction/scattering particle size distribution measurement, which can be measured in accordance with JIS Z 8825:2013.

The proportional content of the (C) colorant in the presently disclosed sealant relative to the total mass of the (A) polyisobutylene polymer and the (B) conjugated diene polymer is preferably 1 mass % or more, and more preferably 2 mass % or more, and is preferably 10 mass % or less, and more preferably 7 mass % or less. When the content of the (C) colorant in the sealant is not less than any of the lower limits set forth above, it is possible to increase visibility when the sealant for an electrochemical device is applied onto an adherend. Moreover, when the content of the (C) colorant in the sealant is not more than any of the upper limits set forth above, elongation at break of an obtained sealant layer can be further increased. Particularly in a case in which a carbon-based pigment is adopted as the (C) colorant, electrical insulation of the sealant can be increased through the content of the (C) colorant in the sealant being not more than any of the upper limits set forth above.

<Various Compounding Agents>

Besides the (A) polyisobutylene polymer, the (B) conjugated diene polymer, and the (C) colorant that is used as necessary, the presently disclosed sealant can optionally contain various compounding agents such as stabilizers, dispersants, and ultraviolet absorbers that are typically used in the resin industry.

Among compounding agents that are optional components, specific examples of stabilizers include phenolic antioxidants, phosphoric antioxidants, sulfuric antioxidants, and so forth. Of these stabilizers, phenolic antioxidants are preferable, and alkyl-substituted phenolic antioxidants are particularly preferable. These stabilizers may be used individually or as a combination of two or more types. The proportional content of a stabilizer in the sealant is selected as appropriate depending on the objective of use and may be not less than 0.001 mass % and not more than 10 mass % when the total mass of the (A) polyisobutylene polymer and the (B) conjugated diene polymer is taken to be 100 mass %.

The presently disclosed sealant can be produced by mixing the above-described (A) polyisobutylene polymer and (B) conjugated diene polymer with the (C) colorant and various compounding agents that are optionally used by a known method. Also note that the various components described above may be added to an organic solvent and then dissolved or dispersed therein so as to directly produce a sealant composition without producing a sealant.

(Sealant Composition)

The presently disclosed sealant composition contains: an organic solvent; and the presently disclosed sealant containing the (A) polyisobutylene polymer, the (B) conjugated diene polymer, and the (C) colorant, various compounding agents, and so forth that are used as necessary. The presently disclosed sealant composition enables efficient formation of a sealant layer having excellent heat resistance and large elongation at break.

The presently disclosed sealant composition for an electrochemical device preferably has a polymer concentration $C^P$ of not less than 5 mass % and not more than 15 mass % as calculated by a formula: $C^P = W^{(A+B)}/(W^S + W^{(A+B)}) \times 100$, where the mass of the organic solvent is taken to be $W^S$ and the total mass of the (A) polyisobutylene polymer and the (B) conjugated diene polymer is taken to be $W^{(A+B)}$. In more detail, the (A) polyisobutylene polymer and the (B) conjugated diene polymer are dissolved in the organic solvent in the presently disclosed sealant composition, and the polymer concentration $C^P$, which corresponds to the dissolved concentration of the (A) and (B) polymers, is preferably not less than 5 mass % and not more than 15 mass %. Through the polymer concentration $C^P$ being not more than the upper limit of the range set forth above, it is possible to inhibit the occurrence of a phenomenon in which the viscosity of the sealant composition becomes excessively high, resulting in non-uniform thickness of a coating film. Moreover, through the polymer concentration $C^P$ being not less than the lower limit of the range set forth above, a coating film formed using the sealant composition can be prevented from becoming excessively thin.

The organic solvent that is used in the sealant composition is an organic solvent in which the polymer components (more specifically, the (A) polyisobutylene polymer and (B)

conjugated diene polymer) of the sealant can dissolve at normal temperature or under heating and is not limited to a specific organic solvent. Specific examples of the organic solvent include aromatic hydrocarbon compounds such as benzene, toluene, and xylene; saturated aliphatic and alicyclic hydrocarbon compounds such as n-hexane, cyclohexane, methylcyclohexane, ethylcyclohexane, nonane, decane, decalin, tetralin, and dodecane; and hydrocarbon mixtures such as gasoline and industrial gasoline.

No specific limitations are placed on the method by which the sealant composition is produced. For example, the sealant composition can be produced by the following procedure. First, the polymer components (more specifically, the (A) polyisobutylene polymer and (B) conjugated diene polymer) are dissolved in the organic solvent and then undissolved material is removed by a filter or the like, as necessary, to obtain a solution. Specific examples of filters that may be used to remove undissolved material include filters obtained through weaving of filiform fiber, metal, or the like into a reticulated form and filters obtained through perforation of fine holes in a planar material. Next, the (C) colorant is dispersed in the obtained solution as necessary, and various compounding agents are further dissolved or dispersed as necessary. Defoaming may also be performed as necessary to remove bubbles contained in the solution. Examples of defoaming methods that may be adopted include vacuum defoaming and ultrasonic defoaming.

<Formation of Sealant Layer>

The following describes one example of a procedure used in formation of a sealant layer using the presently disclosed sealant composition. The following description relates to the formation of a sealant layer in production of, from among electrochemical devices, a cylindrical lithium ion battery in which a non-aqueous electrolyte solution is used. In a cylindrical lithium ion battery according to one example, a ring-shaped, electrically insulating gasket that is formed of a resin material is provided in-between a battery lid and a battery can (hereinafter, referred to as a "metal container") formed of a metal material in order to seal the battery.

First, a specific amount of the presently disclosed sealant composition set forth above is fed and applied onto either or both of an inner wall surface of the metal container and a surface of the insulating gasket using a metering pump such as an air-driven metering dispenser, roller pump, or gear pump. After this application, the sealant composition is naturally dried while maintaining a horizontal state to prevent non-uniform coating of the sealant composition, and thus the organic solvent is removed to form a thin layer. The insulating gasket is preferably formed of a highly polar resin such as a TPC (ThermoPlastic Copolyester).

Note that the application is not limited to being performed by a method using a metering pump and may be carried out by hand using a brush so long as the amount is small. Moreover, the drying may alternatively be forced drying using a heating device instead of natural drying. This enables drying in a shorter time and thus provides a process that is more industrially appropriate.

In a case in which a heating device is used, drying is normally performed at a temperature of approximately 30° C. to 150° C. for a drying time of approximately 5 minutes to 180 minutes to remove the organic solvent from the coating film and obtain a sealant layer. The residual concentration of the organic solvent in the sealant layer is preferably adjusted to 5 mass % or less, more preferably 2 mass % or less, even more preferably 1 mass % or less, and particularly preferably 0.5 mass % or less through removal of the organic solvent by drying. In a situation in which the drying temperature of the organic solvent exceeds or is around the boiling point of the organic solvent, surface unevenness may arise as a result of foaming occurring. Therefore, it is preferable that the drying temperature is set in accordance with properties of the organic solvent. The drying temperature is, as a rough guide, preferably set as a temperature at least 5° C. lower than the boiling point of the organic solvent, and more preferably at least 10° C. lower than the boiling point of the organic solvent, and the sealant composition is normally dried within a temperature range of not lower than 30° C. and not higher than 150° C. while also taking into account the boiling point of the organic solvent.

The thickness of the sealant layer formed by the method described above may be freely selected based on the size of the metal container, the insulating gasket, and so forth, and is normally not less than 0.1 µm and not more than 100 µm. The ease of formation of the sealant layer is increased through the thickness of the sealant layer being not more than the upper limit of the range set forth above. Moreover, problems of leakage of electrolyte solution and infiltration of moisture can be inhibited and the sealant layer can be prevented from easily severing through the thickness of the sealant layer being not less than the lower limit of the range set forth above.

EXAMPLES

The following describes the present disclosure through examples. However, the present disclosure is not limited to these examples. Note that "parts" and "%" in the present examples are by mass, unless otherwise specified. In the examples and comparative examples, evaluations of heat resistance and elongation at break were performed as described below. Moreover, each (B) conjugated diene polymer used in the examples and comparative examples was polymerized as described below in Polymerization Example 1 or Polymerization Example 2.

<Heat Resistance>

A sealant composition was applied by a doctor blade with a gap of 200 µm using a PTFE film (product name: NAFLON film; thickness: 0.05 mm) as a substrate and was dried by an 80° C. hot plate for 1 hour. The obtained coating film, together with the PTFE film of the substrate, was cut to a ribbon shape of 5 mm in width to prepare a test specimen. The test specimen was placed on a glass plate and was heated in a 120° C. Geer oven for 5 hours in a horizontal state. The test specimen that had been heated was removed from the Geer oven and left to cool, and then the width of the test specimen was measured. In a case in which the test specimen has good heat resistance, the width thereof does not change. In a case in which the test specimen has poor heat resistance, the test specimen melts and the width thereof increases. In a case in which the test specimen has even worse heat resistance, the test specimen protrudes beyond the PTFE film and becomes adhered to the glass plate.

A: Width of test specimen does not change
B: Width of test specimen increases but test specimen does not adhere to glass
C: Test specimen adheres to glass <Elongation>

A sealant composition was applied by a doctor blade with a gap of 200 µm using a PTFE film (product name: NAFLON film; thickness: 0.05 mm) as a substrate and was dried by an 80° C. hot plate for 1 hour. The obtained coating film, together with the substrate, was cut to a width of 5 mm to obtain a substrate-equipped test specimen. The substrate was peeled from the substrate-equipped test specimen, and then a tensile tester was used to measure elongation at break of the test specimen. The chuck distance in the tensile test was set as 20 mm. The chuck distance at the point at which breaking of the test specimen occurred was taken to be $D^B$, and a value (%) for elongation at break was calculated by the following formula.

Elongation at break (%)=($D^B$ mm−20 mm)/20 mm×100

<Polymerization Example 1: Conjugated Diene Polymer (B-1)>

A 10 L autoclave equipped with a stirrer was charged with 5,000 g of toluene and 810 g of butadiene and these materials were sufficiently stirred. Thereafter, 0.27 mol of diethylaluminum chloride and 0.6 mmol of chromium chloride-pyridine complex were added and polymerization was carried out for 3 hours under stirring at 60° C. Polymerization was subsequently terminated through addition of 100 mL of methanol. After termination of polymerization, the polymerization liquid was cooled to room temperature and then removed from the autoclave. The obtained polymerization liquid was subjected to steam coagulation and then vacuum drying at 60° C. for 48 hours to yield 780 g of a solid conjugated diene polymer (B-1). The weight-average molecular weight (Mw) of the obtained conjugated diene polymer (B-1) was 390,000.

<Polymerization Example 2: Conjugated Diene Polymer (B-2)>

A 10 L autoclave equipped with a stirrer was charged with 5,000 g of toluene and 810 g of butadiene and these materials were sufficiently stirred. Thereafter, 0.20 mol of diethylaluminum chloride and 0.6 mmol of chromium chloride-pyridine complex were added and polymerization was carried out for 3 hours under stirring at 60° C. Polymerization was subsequently terminated through addition of 100 mL of methanol. After termination of polymerization, the polymerization liquid was cooled to room temperature and then removed from the autoclave. The obtained polymerization liquid was subjected to steam coagulation and then vacuum drying at 60° C. for 48 hours to yield 760 g of a solid conjugated diene polymer (B-2). The weight-average molecular weight (Mw) of the obtained conjugated diene polymer (B-2) was 520,000.

(Example 1)

A homogeneous solution (sealant composition) having a polymer concentration $C^P$ of 10 mass % as determined by the following formula was obtained by mixing 95 parts of butyl rubber (BUTYL 365 produced by Japan Butyl Co., Ltd.) as (A) a polyisobutylene polymer, 5 parts of the conjugated diene polymer (B-1) obtained in Polymerization Example 1 as (B) a conjugated diene polymer, 5 parts of carbon black (furnace black having a primary particle diameter in accordance with JIS Z 8825:2013 of 10 nm) as (C) a colorant, and an appropriate amount of an organic solvent (xylene) under heating at 50° C. in a flask equipped with an impeller. The obtained sealant composition was used to perform the various measurements and evaluations described above. The results are shown in Table 1.

Polymer concentration $C^P = W^{(A+B)}/(W^S + W^{(A+B)}) \times 100$

In the preceding formula, $W^S$ represents the mass of the organic solvent and $W^{(A+B)}$ represents the total mass of the (A) polyisobutylene polymer and the (B) conjugated diene polymer.

(Examples 2 to 4 and Comparative Examples 1 to 4)

A homogeneous solution (sealant composition) having a polymer concentration $C^P$ of 10 mass % was obtained in the same way as in Example 1 with the exception that the types and/or amounts of various components were changed as indicated in Table 1. The obtained sealant composition was used to perform various measurements and evaluations in the same way as in Example 1. The results are shown in Table 1.

Note that a styrene-isobutylene-styrene triblock copolymer (SIBS) compounded in Example 3 and Comparative Examples 3 and 4 was a block copolymer (SIBSTAR® 062H produced by Kaneka Corporation; SIBS triblock copolymer) that included an isobutylene block and styrene blocks.

In Table 1, "SIBS" indicates styrene-isobutylene-styrene triblock copolymer.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| (A) Polyisobutylene polymer | Butyl rubber | Parts by mass | 95 | 90 | — | 85 | 100 | 70 | — | — |
| | SIBS | Parts by mass | — | — | 90 | — | — | — | 100 | 70 |
| (B) Conjugated diene polymer | B-1 (Mw: 390,000) | Parts by mass | 5 | — | 10 | 15 | — | 30 | — | — |
| | B-2 (Mw: 520,000) | Parts by mass | — | 10 | — | — | — | — | — | 30 |
| (C) Colorant | Carbon black | Parts by mass | 3 | 5 | 3 | 5 | 3 | 5 | 5 | 5 |
| Polymer concentration $C^P$ | | Mass % | 10 | 10 | 10 | 10 | 10 | 10 | 10 | 10 |
| Evaluation | Heat resistance | | A | A | A | A | C | A | B | A |
| | Elongation at break | % | 200< | 200< | 200< | 200< | 200< | 63 | 105 | 56 |

It can be seen from Table 1 that in Examples 1 to 4 in which the used sealant contained (A) a polyisobutylene polymer in a proportion of more than 60 mass % and not more than 98 mass % and (B) a conjugated diene polymer in a proportion of not less than 2 mass % and less than 40 mass % relative to the total mass of the (A) polyisobutylene polymer and the (B) conjugated diene polymer, it was possible to form a sealant layer having excellent heat resistance and large elongation at break.

In contrast, it can be seen from Table 1 that heat resistance could not be increased in Comparative Example 1 in which (B) a conjugated diene polymer was not compounded. It can also be seen that elongation at break was inadequate in Comparative Examples 2 and 4 in which 30 mass % of (B) a conjugated diene polymer was compounded. It can also be seen that in a case in which a styrene-isobutylene-styrene triblock copolymer (SIBS) was used as (A) a polyisobutylene polymer and in which (B) a conjugated diene polymer was not compounded, heat resistance and elongation at break could not be increased in a good balance to a level comparable to that in Examples 1 to 4.

INDUSTRIAL APPLICABILITY

According to the present disclosure, it is possible to provide a sealant with which it is possible to produce a sealant composition that can form a sealant layer having excellent heat resistance and large elongation at break.

Moreover, according to the present disclosure, it is possible to provide a sealant composition that can efficiently form a sealant layer having excellent heat resistance and large elongation at break.

The invention claimed is:

1. A sealant for an electrochemical device comprising: (A) a polyisobutylene polymer; and (B) a conjugated diene polymer, wherein the (A) polyisobutylene polymer is contained in a proportion of more than 84 mass % and not more than 96 mass % and the (B) conjugated diene polymer is contained in a proportion of not less than 4 mass % and less than 16 mass % relative to total mass of the (A) polyisobutylene polymer and the (B) conjugated diene polymer.

2. The sealant for an electrochemical device according to claim 1, further comprising (C) a colorant, wherein the (C) colorant is contained in a proportion of not less than 1 mass % and not more than 10 mass % relative to total mass of the (A) polyisobutylene polymer and the (B) conjugated diene polymer.

3. A sealant composition for an electrochemical device comprising: an organic solvent; and the sealant for an electrochemical device according to claim 1.

* * * * *